(12) United States Patent
Breuer et al.

(10) Patent No.: US 12,120,547 B2
(45) Date of Patent: Oct. 15, 2024

(54) METHOD FOR SELECTION OF A NETWORK SLICE

(71) Applicant: Telit Cinterion Deutschland GmbH, Munich (DE)

(72) Inventors: Volker Breuer, Boetzow (DE); Lars Wehmeier, Falkensee (DE)

(73) Assignee: Telit Cinterion Deutschland GmbH, Munich (DE)

( * ) Notice: Subject to any disclaimer, the term of this patent is extended or adjusted under 35 U.S.C. 154(b) by 176 days.

(21) Appl. No.: 17/254,563

(22) PCT Filed: Jun. 24, 2019

(86) PCT No.: PCT/EP2019/066697
§ 371 (c)(1),
(2) Date: Dec. 21, 2020

(87) PCT Pub. No.: WO2020/002253
PCT Pub. Date: Jan. 2, 2020

(65) Prior Publication Data
US 2021/0250803 A1    Aug. 12, 2021

(30) Foreign Application Priority Data
Jun. 26, 2018   (EP) ..................................... 18179795

(51) Int. Cl.
*H04W 28/02* (2009.01)
*H04W 48/18* (2009.01)
*H04W 60/04* (2009.01)

(52) U.S. Cl.
CPC ....... *H04W 28/0268* (2013.01); *H04W 48/18* (2013.01); *H04W 60/04* (2013.01)

(58) Field of Classification Search
CPC . H04W 28/0268; H04W 48/18; H04W 60/04; H04W 48/16; H04W 48/20
See application file for complete search history.

(56) References Cited

U.S. PATENT DOCUMENTS

| 2017/0367036 | A1 | 12/2017 | Chen et al. |
| 2018/0176858 | A1 | 6/2018 | Wang et al. |
| 2019/0174406 | A1* | 6/2019 | Hwang ................ H04B 17/318 |

FOREIGN PATENT DOCUMENTS

WO    2011107886 A1    9/2011

OTHER PUBLICATIONS

International Search Report (PCT/ISA/210) issued on Aug. 30, 2019, by the European Patent Office as the International Searching Authority for International Application No. PCT/EP2019/066697.

(Continued)

*Primary Examiner* — Khoa Huynh
(74) *Attorney, Agent, or Firm* — PEARL COHEN ZEDEK LATZER BARATZ LLP (57) ABSTRACT

A method for selection of a network slice by a user equipment operating in a cellular network includes the steps of: receiving, from at least one of a plurality of base stations, a signalling indicating a set of quality of service values supported by at least one of the base stations, determining at least one supported network service for respective base stations, prioritizing the base stations by means of said determined supported network service in consideration of at least one out of the list of preferred network services, selecting one of the base stations considering said prioritization of frequencies, and to set up a preferred network service: sending a network slice selection message indicating a quality of service value relating to the network service, sending an attach request via the serving base station to the network mobility unit.

14 Claims, 4 Drawing Sheets

(56) References Cited

OTHER PUBLICATIONS

Samsung: "Consideration on the impact of slice availability in idle mobility", vol. Ran WG2, Jan. 17, 2017, 4 pages.
Sequans Communications: "Cell reselection upon incoming service request", vol. Ran WG2, Feb. 20, 2018, 4 pages.
Written Opinion (PCT/ISA/237) issued on Aug. 30, 2019, by the European Patent Office as the International Searching Authority for International Application No. PCT/EP2019/066697.
Xiaomi (Rapporteur): "Report of e-mail discussion: [97bis#14] [NR] Slicing", vol. RAN WG2, Aug. 20, 2017, 37 pages.
3GPP "TS 23.501" V15.2.0, 3rd Generation Partnership Project; Technical Specification Group Services and System Aspects; System Architecture for the 5G System; Stage 2; (Release 15) (Jun. 2018).

* cited by examiner

METHOD FOR SELECTION OF A NETWORK SLICE

CROSS-REFERENCE TO RELATED APPLICATIONS

This application is a National Phase Application of PCT International Application No. PCT/EP2019/066697, International Filing Date Jun. 24, 2019, claiming priority to European Patent Application No. 18179795.2, filed Jun. 26, 2018, which are hereby incorporated by reference.

FIELD OF THE INVENTION

The present invention relates to a method for selection of a network slice by a user equipment. The device further relates to a user equipment using said method.

The invention further relates to a method for operating of a base station. The invention also pertains to a base station using said method.

BACKGROUND OF THE INVENTION

In the field of cellular wireless communication new technology standard generations are in the advent which are designated to handle different types of user equipments and use cases of such user equipments. For the coming technology standard named New Radio resp. 5G it is planned to introduce a so called network slicing concept in the network, according to in ETSI 3GPP TS23.501, Chapter 5.15. A network slice forms a complete logical network including Radio Access Network (RAN) and Core network (CN), which provides wireless communication services and makes available network capabilities, and wherein these services and capabilities may differ in each network slice. By now it is envisaged that a cellular network supporting 5G may comprise up to 1000 network slices.

It is clarified in the technology standard, how the user equipment informs the cellular network about which network slices it desires to use, as for this task the new message Network Slice Selection Assistance Information (NSSAI) from the user equipment via the RAN to the core network is introduced (TS23.501 Chapter 5.15.2). However, not defined is by now for the user equipment how to figure out on which base station (in 5G called gNB) on which frequency a desired service in the appropriate network slice is provided. Obviously it is no option to provide on demand or via broadcast a list of all network slices and the related access information, as this would result in a too time and power consuming signalling. Furthermore there is yet no signaling between core network and RAN informing on the services where user equipments are registered for. Nor would the gNB know which services the user equipment would like to execute next or most often which would be necessary information for the gNB to make a decision on which frequency to send the user equipment. Frequency re-direction with respect to the service so far can only be done once a PDP-context is requested for said service. Then it is also obvious for the gNB which service is desired and the gNB could stipulate a redirection to another frequency being more suited prior or after service execution.

Hence it requires a new method for selection of a network slice for the user equipment which considers the desired service. It is therefore the goal of present invention to propose a solution for an improved selection of a network slice by the user equipment.

Further alternative and advantageous solutions would, accordingly, be desirable in the art.

SUMMARY OF THE INVENTION

According to a first aspect, the invention is embodied as a method for selection of a network slice by a user equipment. According to a second aspect, the invention is embodied as a user equipment. According to a third aspect, the invention is embodied as a method for operating a base station of a cellular network. According to a fourth aspect, the invention is embodied as a base station.

According to the first aspect of the invention it is proposed a method for selection of a network slice by a user equipment operating in a cellular network comprising at least two network slices, a plurality of base stations, and at least one network mobility unit, the user equipment being configured to camp on one of the base stations, hereinafter the serving base station, and to maintain a list of preferred network services, the method comprising the steps of:

receiving from at least one of the plurality of base stations a signalling indicating a set of quality of service values supported by the base station, determining from said received sets of supported quality of service values at least one supported network service for respective base stations, prioritizing the base stations by means of said determined supported network service in consideration of at least one out of the list of preferred network services, selecting one of the base stations considering said prioritization, and for setting up of one of the preferred network service:

sending a network slice selection message indicating a quality of service value relating to the network service to the serving base station, sending an attach request via the serving base station to the network mobility unit, for attaching to the selected network service on the corresponding network slice.

The invention affects a user equipment for operation in a cellular network. The user equipment is preferably equipped with communication circuitry, processing circuitry and at least one memory unit. The user equipment is operating in a cellular network comprising a plurality of base stations. The cellular network is implementing at least one of the cellular technology standards like 4G (LTE), 5G (New Radio), and/or beyond.

The cellular network further comprises at least two network slices. Network Slicing enables multiple separate end-to-end networks (network slices) sharing the same or using separate infrastructure. Each network slice can be customized independently for different services and business scenarios resp. usages (SLAs).

A network slice in this sense is known as a complete logical network including Radio Access Network (RAN) and Core network (CN), which each provides to a certain user equipments wireless communication services and makes available network capabilities. Each network slice implements certain specific network services and capabilities. In that way the network slice directly corresponds to the network service. That means, for a specific user equipment of a kind, a certain of the set of network slices is best suited for them to communicate according to the available services and capabilities. Likewise for the cellular network it is possible to arrange its RAN resp. CN components that way, that an intense usage of one network slice through the user equipments operating in this network slice, e.g. massive MTC, would not affect the operation of other network slices, e.g. for voice communication.

The user equipments may differ, starting from mobile phones, to machine-to-machine devices like smart-metering applications, point-of-sales devices, tracking equipment, or automotive entertainment units. Some user equipment has the desire for large data transmissions in short time, other for very low latency, regular transmissions of low amounts of data, or high coverage, etc. It therefore gives a need for a user equipment with such requirements to select an appropriate network slice.

It is further proposed determining corresponding frequency indications from at least one out of the received set of quality of service values for at least two base stations, wherein the frequency indications comprise information relating to a frequency range the user equipment and the base station use for a communication link, and considering said frequency indications of the selected base station for attaching to the selected network service.

Such frequency indication preferably relates to one of: a) a frequency value in MHz or GHz, supported by the base station, in particular for the Master Information Block, b) a frequency range, in particular indicated or derivable to a lower and upper frequency value, c) a channel or carrier number, like the so-called NR-ARFCN (New Radio Absolute Radio Frequency Channel Number).

A network slice corresponds to a frequency range for signalling in up- and/or downlink. The respective frequency range needs to be supported by a base station in order to allow a user equipment to access the network slice, when camping on said user equipment. With a network service indication the respective frequency indication is congruent, or vice versa.

For selection of an appropriate network slice the user equipment maintains a list of preferred network services. This list comprises identifications of what kind of services may be supported. Depending on the type of user equipment the list may be of different size. For simple one-purpose user equipments this list may even comprise only one entry.

In preparation of selection of a network service the user equipment receives a signaling from one or more base stations, wherein the base station indicates a set of quality of service values supported by the base stations.

Such quality of values service in particular relates to the 5QI priority model, as introduced in the 5G technology standard described in TS23.501 Paragraph 5.7. This means, with transmitting in the signaling of the base station a list of 5QI values, representing the supported quality of service, the respective network slices arranged for supporting the respective quality of service are predefined. The quality of service information relate to retention time, priority type, error rate etc.

Advantageously the signalling is received from only one base station, in particular the serving base station. Preferably such signalling comprises the quality of service values for the serving base station, and additionally for at least one other base station, in particular in proximity of the serving base station. Such the user equipment in the ideal case receives without listening to other base stations the information about supported services, and the respective quality of service, resp. frequency range such services are supplied, for further, or even all the base stations that are available for the user equipment.

Preferably the quality of service value are coded for optimized transmission. This approach is advantageous as a base station might support more than 1000 network slices. It would not be feasible to signal all supported network slices and let the user equipment choose. In the light of Internet-of-Things-(IoT)-communication, some user equipments would either from the available processing power or the available battery power not be equipped to receive and handle such amount of data.

Transmission of the quality of service values, in particular the 5QI values is much more convenient instead, so far 3GPP defined about 21 values according to TS25.301 Table 5.7.4-1: *Standardized 5QI to QoS characteristics mapping*. Even when the number of records of said table is increased it will stay far smaller than the 1000 network slices which can be max. number supported by a cellular network.

Preferably the user equipment receives the signalling of the set of quality of service values from the serving base station, that is the one the user equipment is camping on. Additionally it is advantageous to also receive such signalling of other base stations in proximity. This is in particular advantageous for the user equipment to choose which of the sufficiently decodable base stations is best suited for handling the desired preferred network services, as memorized in the mentioned list of preferred network services.

This indicates that at least for the base stations, the user equipment is not camping on, the quality of service values are preferably signaled via a broadcast. However, at least for the serving base station also a transmission by means of dedicated signalling is foreseen, preferably on request of the user equipment.

After receiving said set of quality of service values the user equipment is set to evaluate those data. This is done by deriving from the received quality of service values the respective network slices, resp. corresponding network services and consequently frequencies According to one embodiment it is proposed that the user equipment maintains a list of network services each in relationship with a quality of service value, wherein the steps of evaluating and prioritizing refer to said list of network services.

Each network service has a defined quality of service value and an assigned network slice, each covered in a standardized table. With the NSSAI the service and the respective frequency range is well defined for the base station.

In a second step the user equipment prioritizes said derived frequencies in consideration of at least one out of the list of preferred network services. This is to match the available network services on the respective base station with the preferred network services. In dependence of the type of device the prioritization mainly refers to the most important network service, or alternatively tries to satisfy the need of each of the preferred network service.

This is, if the quality of service for the most important network service indicates for the base station to be best suited for the user equipment, this may mean, that other services on the list of preferred network services are not supported at all. Hence, it may be useful, when the user equipment prefers a base station, that supports all network services, but the most important one not in the best possible way.

The best strategy for prioritization preferably takes into account knowledge of the user equipment about the next network services to be carried out. If a user equipment is not able to respond to a voice call from the outside, like it is typical for IoT user equipments, it might be clearly scheduled that for the next X hours only small data transmissions are planned. With this knowledge the respective network service for small data transmission may be chosen.

Preferably the user equipment is configured to operate in more than one service, e.g. data and voice connection, or regularly short data transmission and once in a while a large update etc. Hence the user equipment preferably analyses the signalling received from a plurality of base stations in that way, that only base stations which are equipped to support all of the network services of the user equipment, are taken into account, irrespective of the quality the most preferred network service would be supported.

As an alternative also a base station provides a relation of the 5G QCI/QoS values to a frequency identification for all values, in particular not only for the network services served by the base station but for all frequencies of said cellular network and hence the user equipment would know just from one base station which is the best frequency to select for a specific network service.

In a further advanced realization certain network services could also be indicated to be available and equally provided on any frequency.

Information relating to the availability of network services is in particular provided by system information, in particular on demand SIBs, resp. only the frequencies on demand. Alternatively the serving cell related information are always broadcasted, while the availability of other base station services is provided on demand.

Such request for on demand system information preferably comprises an indication for the respective service the user equipment is planning to request from the base station. It is consequently preferably when on request for one or a more services the serving base station would provide the quality of service values, resp. frequency indications for the base stations that are capable of supplying such requested services.

The frequency indication determining step and the prioritization step may be conducted in opposite order, or intertwined. When the supported services are derived, it may be appropriate to first filter according to preferred service, and afterwards derive frequencies. This variant is also encompassed by the inventive method.

The user equipment has a result of the previous steps a priority of base stations resp. frequency indications for a base station considering the preferred network services and might choose the frequency with the highest priority in order to continue and selects the base station providing that frequency.

According to a preferred embodiment of the invention it is proposed in case the selected base station differs from the serving base station, prior to sending the attach message, performing a reselection for selecting a second base station as serving base station.

This embodiment comes into play when the user equipment decides for a different base station than the serving base station during evaluation and prioritization of the received signalling This requires receiving the signalling of the quality of service values from more than for the serving base station.

When the best fitting network service bouquet is provided by a different base station, the user equipment carries out a reselection and makes the selected base station to the serving base station.

The following steps of the inventive method would then continue with the newly selected serving base stations.

For setting up the next network service the user equipment is consequently sending a network slice selection message to the serving base station. This network slice selection message comprises the quality of service value relating to the planned network service. The base station is in response to that message expected to handle the request that way that the user equipment is operated by the respective network slice. This is preferably done by the NSSAI message, which is already defined in the 5G technology standard.

Hence the user equipment by identifying the appropriate 5QI value matching to the expected network service carries out a selection of network service. With the signaling of supported quality of service values, in particular 5QI values, the user equipment has the means to figure out if the currently serving base station is supporting that network slice.

Finally the user equipment sends an attach request via the serving base station to the network mobility unit, in particular the MME, and will then be attached to the selected network service on the respective network slice.

With the new signalling of the quality of service values each base station provides in a manageable way its network slice capabilities and allows the user equipment to carry out a selection of base station and network slice resp. frequency in consideration of the user equipments needs. The network by now does not have this knowledge available and would not be able to assign the user equipment to an appropriate network slice.

Further the inventive method saves a to and fro of network slice selection messages until a base station supporting a network slice is found. Further the inventive method does not only reveal a base station which somehow could allow the user equipment to carry out the selected network service, it even more gives the user equipment the opportunity to select a base station, which is best suited for providing that service in the network slice on a dedicated frequency.

According to another preferred embodiment it is proposed that in conjunction with receiving of the set of quality of service values receiving power consumption ratings affecting at least one service represented by the set of quality of service values, and the step of prioritizing also comprises considering said power consumption rating.

This embodiment relates to the signalling the user equipment receives. In conjunction with this signalling, that means in the same message or before or after that signalling, the user equipment receives from the base station information relating to the power consumption for at least one of the quality of service values, in particular indicated for the frequency range Such power consumption values give valuable information for the user equipment in order to evaluate if such network service is in the corresponding network slice suitably usable.

Hence the user equipment takes this information into account during the prioritizing of the received signals for deciding on which base station to operate.

This is for such user equipments advantageous that act in the field of IoT-devices. For that type of user equipments it is often the case that they have a certain power budget in order to achieve a predefined lifetime with a battery.

Hence the user equipment would in case of two identically equipped base stations have the change to decide based on such power consumption values, which base station is more appropriate.

If the base station with the lower power consumption for the envisaged service is not the serving base station, the user equipment preferably additionally takes into account that the reselection to the power-wise better base station also requires additional power consumption. Hence in that case a sufficient difference of the power consumption compared to the serving base station—if this supports the requested service at all—is necessary for really reselecting to the other base station.

In another preferred embodiment it is suggested that in case the selected network service is due not before a predetermined time period,
- selecting one of the base stations considering said prioritization and said power consumption values for operating in idle mode,
- selecting one of other base station considering said prioritization and said power consumption values for attaching to said selected network service, within said predetermined time period.

With this embodiment it is envisages to improve the power consumption footprint of the user equipment even more. For the case that a network service is scheduled in a certain time, e.g. some minutes or hours away, it is therefore proposed to select the base station first for camping e.g. in idle mode and second for carrying out the network service upon the scheduled time. For the idle mode camping another base station might be more appropriate, in particular in terms of power consumption, than it is the base station for carrying out the envisaged network service. Hence it is preferable to change to the base station for conducting said network service just before the service starts.

This is in particular imminent for stationary user equipments, which do not move and hence where the base station coverage situation does not change that often.

In another advantageous embodiment it is proposed that the set of quality of service values comprises a limited number of quality of service values which relate to a predetermined number of network services, wherein said network service are considered as network service with highest usage.

With this embodiment the signalling of quality of service values is supposed to reduced. This is achieved by reducing the signaled number of quality of service values to a predetermined number, which is lower than the actual number of supported services for a respective base station. This is advantageous as it also reduces time and power for the user equipment handling such transmission, in particular from a plurality of base stations around.

The reduction is carried out through filtering the quality of service values for those network services resp. network slices which are most often used by user equipments camping on the base station.

When however a service is requested, that is not reported in this signalling the device will choose the frequency according to received signal strength and apply normal ranking/frequency prioritization. This is advantageous as it allows a smooth migration to the inventive method.

According to a second aspect of the invention it is proposed a user equipment configured for operating in a cellular network comprising at least two network slices, a plurality of base stations, and at least one network mobility unit, the user equipment being configured to camp on one of the base stations, hereinafter the serving base station, and to maintain a list of preferred network services, the user equipment being configured for selection of one of the network slices to:
- receive from at least one of the plurality of base stations a signalling indicating a set of quality of service values supported by the base station,
- determine from said received sets of supported quality of service value at least one supported network service for respective base stations,
- prioritize said base stations by means of said determined supported network services in consideration of at least one out of the list of preferred network services,
- select one of the base stations considering said prioritization, and for setting up of one of the preferred network service to:
- send a network slice selection message indicating a quality of service value relating to the network service to the serving base station,
- send an attach request via the serving base station to the network mobility unit, for attaching to the selected network service on the corresponding network slice.

Said user equipment is equipped with communication circuitry, in particular receiving and transmitting circuitry, preferably a transceiver, configured to be connected to at least one antenna, at least one processing circuitry and at least one memory unit, in particular volatile and/or permanent memory. The operating software is stored in the at least one memory unit and executed on said processing circuitry. In the at least one memory unit the user equipment has stored a list of preferred network services, indicating the network services the user equipment is configured to operate. Such limitation might be due to technical restrictions of the user equipment, the use case, or limitation in the subscription, e.g. data-only, which is stored in a subscription storage unit, connected to or comprised in the user equipment.

The user equipment is configured for operating in a cellular network comprising a plurality of base stations. The base station the user equipment is operating on is the serving base station.

This embodiment shares the advantages of the first aspect of the invention.

According to a third aspect of the invention it is proposed a method for operating a base station of a cellular network, said cellular network comprising at least two network slices, a plurality of base stations, and at least one network mobility unit, said base station being configured to serve a plurality of user equipments camping on said base station, the method comprising the steps for the base station:
- signalling to at least one of the camping user equipments a set of quality of service values supported by the base station,
- receiving a network slice selection message from one of the user equipments indicating a quality of service relating to a network service preferred by the user equipment,
- upon receiving an attach request from said user equipment, setting up the network service on a network slice corresponding to said network service.

This aspect of the invention refers to a base station of a cellular network configured to operate with at least one user equipment according to the second aspect of the invention.

The cellular network is implementing at least one of the cellular technology standards like 4G (LTE), 5G (New Radio), and/or beyond. It typically comprises also a Radio Access Network (RAN) and a Core Network (CN).

The cellular network further comprises at least on network mobility unit. This is typically a MME (Mobility Management Entity), as defined in LTE and/or New Radio.

The cellular network further comprises at least two network slices, each dedicated for a certain type of user equipments. Possibly the cellular network comprises for at least two network slices each a MME.

The inventive method according to this aspect of the invention is designated to support the user equipment in selecting an appropriate base station, resp. frequency area where a network service is about to be performed, resp. the network slice, where the service is handled inside of the cellular network.

As part of this it is proposed that the base station signals to user equipments a set of quality service values supported by the base station. This is preferably happening by a broadcast, e.g. as part of the system information.

Preferably the method further comprises that in conjunction with signalling of the set of quality of service values the step of signalling at least one power consumption ratings for a frequency indication on which said network service is provided.

With this embodiment the base station additionally assures that the user equipment is aware of the power consumption it has to expect when executing the respective service. Such power consumption ratings include any type of parameter where the user equipment can derive the power consumption. This is in particular the required signalling power, in case of enhanced coverage the number of repetitions, the applied DRX cycle length or extended DRX cycle, number of paging occasions and their periodicity, early data transmission capability, need to perform further measurements or existing measurement relaxation rules, i.e. time between mandated measurements on same or different carriers validity of provided system information, if difference in time.

In general for power consumption evaluation in the user equipment the base station may indicate the supported maximum values in relation to above mentioned features, so that the user equipment can derive according to the needs of its application how power consuming camping on said base station, resp. choosing the prioritized frequency, would be. The power consumption related values are preferably provided generally, in special cases also network service specific.

In another preferred embodiment it is proposed that the base station is further configured to provide system information by means of at least one of scheduled system information broadcast and on demand system information, wherein the system information comprises for at least one network service a frequency indication for using said network service.

According to this embodiment related supported parameters can also be provided on demand, when requested by the user equipment, in particular by means of on demand SIBs. This method may also include indications to other frequencies where a requested feature may be supported with higher resp. maximum values. Preferably the user equipment requests such information by means of providing at least one requested network service.

Those values mostly impact the power consumption when the user equipment is operating in idle mode, and therefore in which frequency indication the user equipment is camping on the base station.

This is clearly visible when referring to the paging frequencies. Each paging occasion consumes power for the user equipment. The number of paging per time unit (paging occasion density) consequently directly impacts the power consumption of a user equipment.

Even in case of same paging occasion density, the number of participants of a particular service, impacts how often each individual device is paged on a certain carrier resp. other frequency indication e.g. with high meter population where the service is latency tolerant, each device may be paged once every several minutes. Assuming smartphones operating on other frequency ranges considering the same paging density and far smaller number of devices, each device may be paged several times within 10 sec. Obviously this leads to a higher power consumption on second frequency range than on first frequency range. However, despite higher power consumption this leads to higher service reachability.

That parameters help the user equipment to decide, if the respective base station is sufficiently suited or at least better suited than other base stations reachable for the user equipment, for performing the envisaged network service.

Power consumption can especially be influenced in power sensitive use cases by avoiding activities not being directly related to data transmission or reception and not being important for said use case. I.e. a fixed user equipment should preferably camp on a cell not mandating mobility measurements. A user equipment only operating with mobile originated (MO) calls, does not need a high paging density, same is true for mobile terminated (MT) operation if the response time does not really matter.

Following this signalling of the set of quality of service values the base station expects to receive from at least one camping user equipment a network slice selection message (NSSAI), including an indication of a quality of service value relating to a network service, and one corresponding of the set of network slices supported by the base station.

Consequently the base station prepares for this requesting user equipment a connection on a frequency assigned to the envisaged network slice.

Upon reception of an attach request the service is hence set up on the network slice corresponding to the requested network service, in particular according to the preparations following the network slice selection message.

In an advantageous embodiment it is proposed that the base station further maintains a list of requested network services occurrences, the method comprising the step of incrementing said network service occurrences in case of receiving an attach request for said network service, and wherein the step of signalling the set of quality of service values only comprises a limited number of quality of service values which relate to a predetermined number of network services corresponding to said list of requested network service occurrences with the highest usage.

In this embodiment the base station carries out a filtering of quality of service values to be submitted, in order to reduce the amount of data to be transmitted.

For this it only sends the quality of service values for those network services with the highest usage.

To determine this, it is preferably foreseen to maintain for each network service a counter, which gets incremented with each request, at least for a given period. A predetermined number of network services with the highest usage numbers are then selected for being signaled to listening user equipments.

The user equipments consequently can take advantage of this embodiment by avoiding too long and/or exhaustive signaling of the quality of service values corresponding to supported network slices of the base station.

According to a fourth aspect it is proposed a base station of a cellular network, the cellular network comprising at least two network slices, a plurality of base stations, and at least one network mobility unit, said base station being configured to serve a plurality of user equipments camping on said base station, wherein the base station is configured:

to signal to at least one of the camping user equipments a set of quality of service values supported by the base station, to receive a network slice selection message from one of the user equipments indicating a quality of service relating to a network service preferred by the user equipment, upon receiving an attach request from said user equipment, to set up the network service on a network slice corresponding to said network service.

This aspect of the invention relates to a base station of the cellular network.

It in particular comprises wireless communication circuitry, in particular a receiver and a transmitter, preferably combined in a transceiver, plus at least one antenna. For large data transmission typically a plurality of antennas for performing MIMO communication is available.

Further the base station has a communication connection to the radio access network (RAN) and/or other components of the cellular network. Such communication connection is usually implemented wired.

The base station further has preferably processing circuitry, at least one memory units and operating software implementing the method of the third aspect of the invention, executed by the processing circuitry.

The base station is configured to serve a plurality of user equipments according to the second aspect of the invention.

The fourth aspect of the invention shares the advantages of the third aspect.

As it is shown this invention advantageously solves the depicted problem and proposes a solution for a user equipment to easily pick a base station and a frequency of the base station for running a network service on a respective network slice, supported by that base station.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

Figure 1:
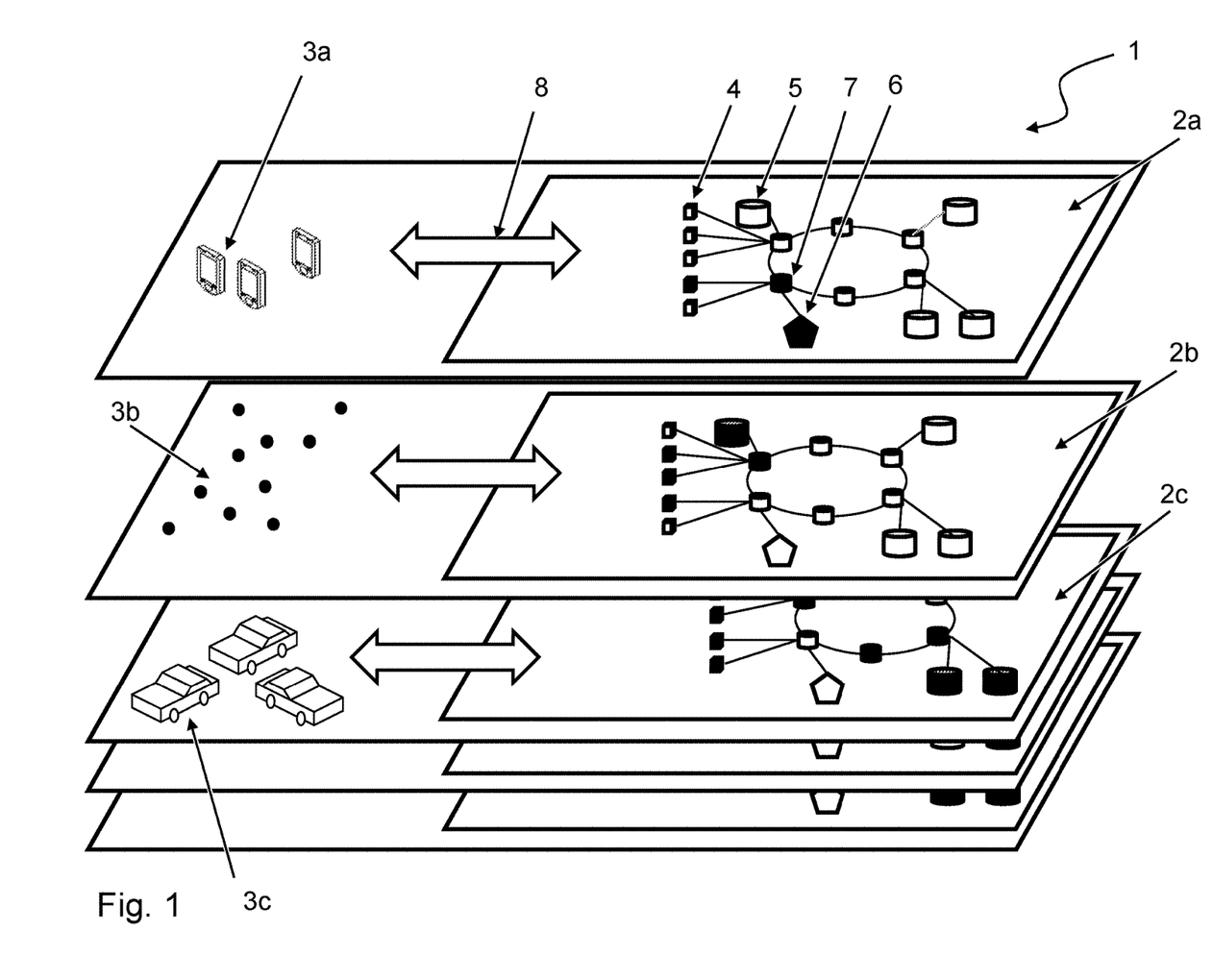
FIG. 1 represents a plurality of user equipments of the type to which the present invention is applied as an embodiment operating in a cellular network comprising a plurality of network slices.

FIG. 1 schematically shows a plurality of user equipments 3 operating in cellular network 1. The cellular network comprises a plurality of network slices 2.1, 2.2, 2.3. Each of it is designated to handle services of different types of user equipments (3.1, 3.2, 3.3).

The cellular network further comprises network components like base stations 4, radio access network 5, the MME 7 and a HSS 6. When the components are shown in full black, they are available in the respective network slice. As a network slice is a logical separation of RAN/CN components it is in the cellular network operators discretion to physically separate it. So there might be a MME 7 for user equipments 3.1 and one for user equipments 3.2. However this may physically be the same.

The same applies to base station 4. When a base station is shown in full black, then it indicates that it is capable to support the respective network slice.

Each network slice 2 is configured to handle certain network service. Some network services expect a certain frequency on the respective base station 3.

So, when a base station 3 does not support that frequency, it is not capable to support that network service, and network slice 2 of course.

This is in particular the case for services transmitting high data volumes in a short period. This is what 5G is designed for in the first place. For such high data rates a higher frequency range is necessary, possible combined with beam-forming. This means, that the base stations 4 provide only low coverage for that service.

For a high data rate data transmission service consequently only base station 4 supporting such frequencies are usable, and hence a high data rate network slice would only include such base stations.

For a user equipment 3 it is hard to figure out, which of the base stations 4 is capable of providing a special service, as it is not convenient to supply upon each camping or through broadcast to retrieve all of the >1000 possible network slices of a cellular network resp. base station.

Figure 2:
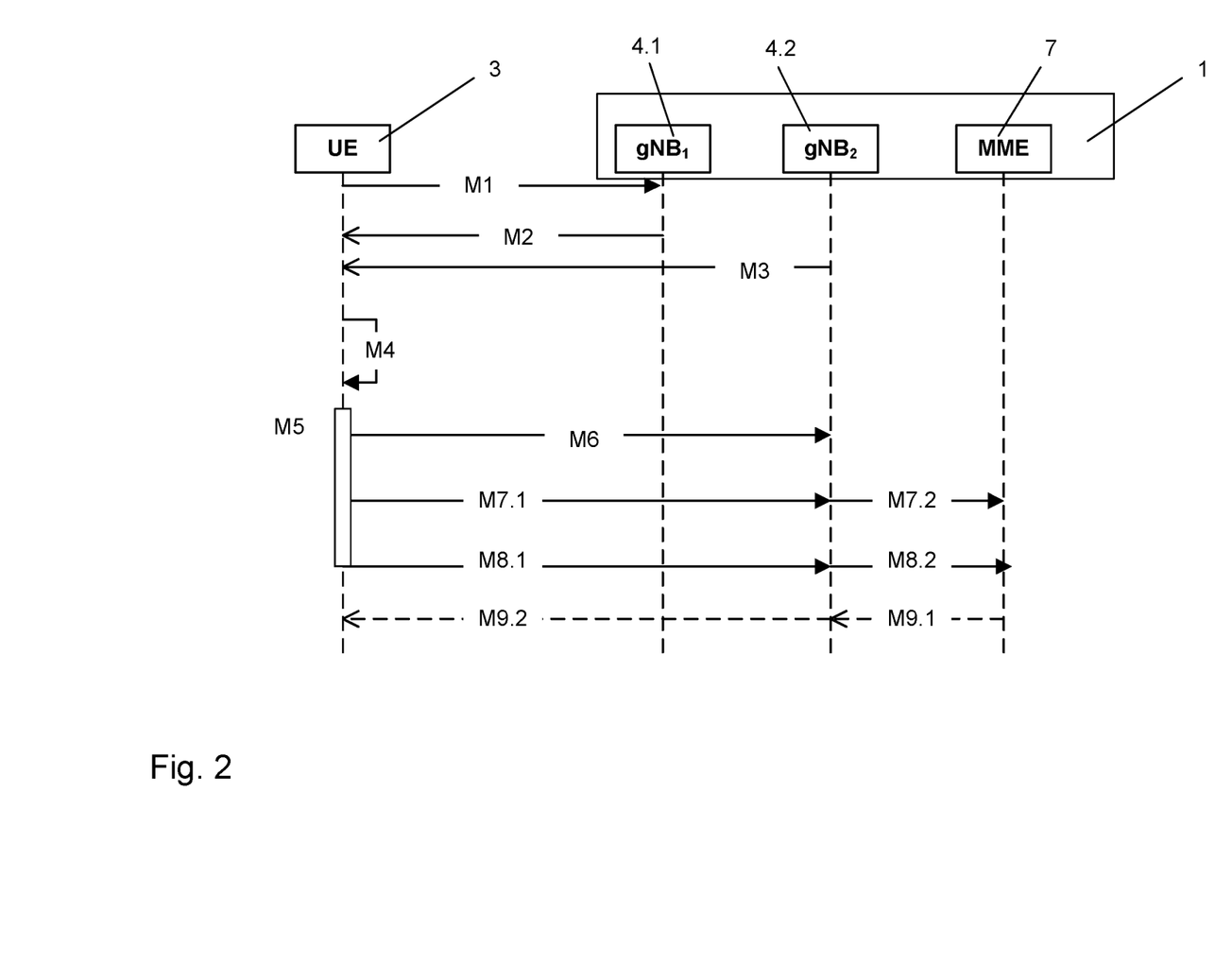
FIG. 2 shows a first sequence diagram showing an exemplifying embodiment of present invention.

In FIG. 2 a first embodiment of the inventive method is shown that addresses this problem. Here a user equipment 3 is planning to start a specific network service in a cellular network 1.

For that two base stations, resp. gNBs, 4.1, 4.2 are available for the user equipment 3.

The user equipment starts with message M1 to camp on gNB 4.1. Through a broadcast message M2 the user equipment gets a set of quality of service values from the gNB 4.1.

In parallel the user equipment receives through broadcast message M3 a set of quality of service values from gNB 4.2.

These sets indicate through the comprised 5QI value the supported services of the respective gNB. This directly indicates the available network slices.

Additionally in an exemplifying embodiment the broadcast messages M1 and M2 further comprise power consumption ratings. This is typically by way of a rating from A-E, each for a network service.

With that information the user equipment 3 not only knows the supported network services but also the power consumption for such services.

For smartphones, like user equipments 3.1, the power consumption might not be of big importance, but this situation is differently for cars or battery driven applications.

Hence in message step M4 the user equipment evaluates the received messages and creates a prioritization, in particular of frequencies in relation to a network service that is about to be started soon.

In the result of that evaluation and prioritization step, the user equipment figures out that the gNB 4.2 is best suited for supplying the envisaged network service. Consequently the user equipment carries out a reselection with message M6 to gNB 4.2.

With a network slice selection message M7.1 to the gNB 4.2, and forwarded to the MME 7 with message M7.2 the user equipment informs the now serving gNB 4.2. and the MME accordingly about the envisaged service, resp. desired network slice. This is done here by means of submitting the selected 5QI value.

With the next attach message M8.1 to the gNB 4.2, the user equipment requests to start a service. Internally this message is forwarded with message M8.2 to the MME.

It is the MME which then responds with message M9.1 to the gNB 4.2 and with message M9.2 that the service is setup, and includes in this message the bearer, which relates to the frequency range, on which the service is supposed to be provided.

Figure 3:
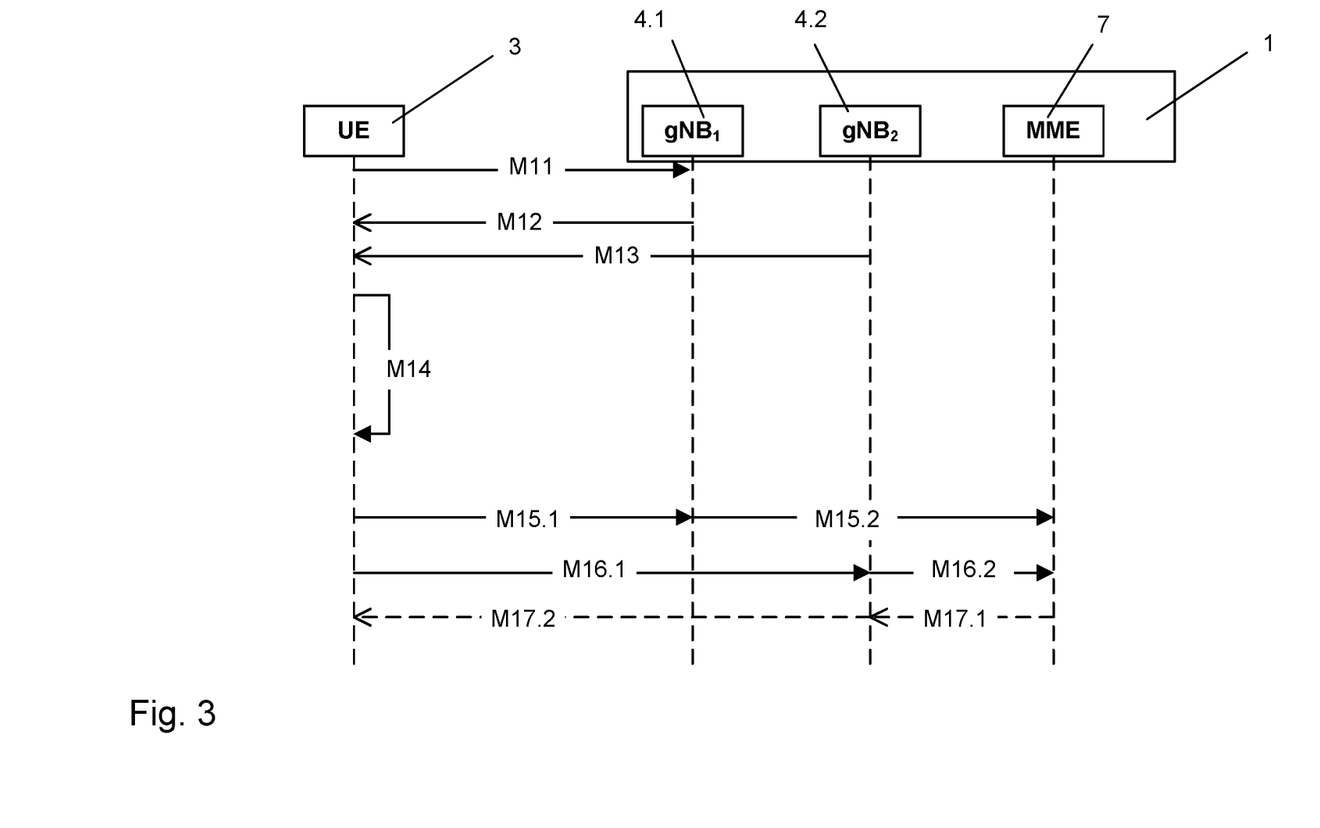
FIG. 3 representing a second sequence diagram showing another exemplifying embodiment of present invention.

In FIG. 3 another exemplifying scenario is shown. Here generally the same message flow is happening in the beginning. The user equipment camps with message M11, receives the broadcast messages M12 and M13 from the two gNBs 4.1, 4.2, and evaluates and prioritizes the received information.

As the envisaged service is not about to be started immediately, the user equipment refrains from reselecting to the gNB 4.2 until the service starts.

However, for the planned service the NSSAI message M15.1 is sent to gNB 4.1, as it forwards the message to the MME 7 anyhow.

Hence, when the service is due to be requested, the user equipment sends with message M16.1 a reselection and attach message to gNB 4.2, wherein both the reselection and the attachment to the depicted service is indicated.

The gNB 4.2 forwards with message M16.2 this message to the MME 7.

The MME is informed through the NSSAI message of the user equipment, that this service is about to be requested, and confirms, if the bearer is supported by the now selected gNB 4.2, to setup the service with message M17.1.

The gNB 4.2 sends with message M17.2 to the user equipment 3 the message about the setup service including the respective bearer, as it was done in previous embodiment.

Figure 4:
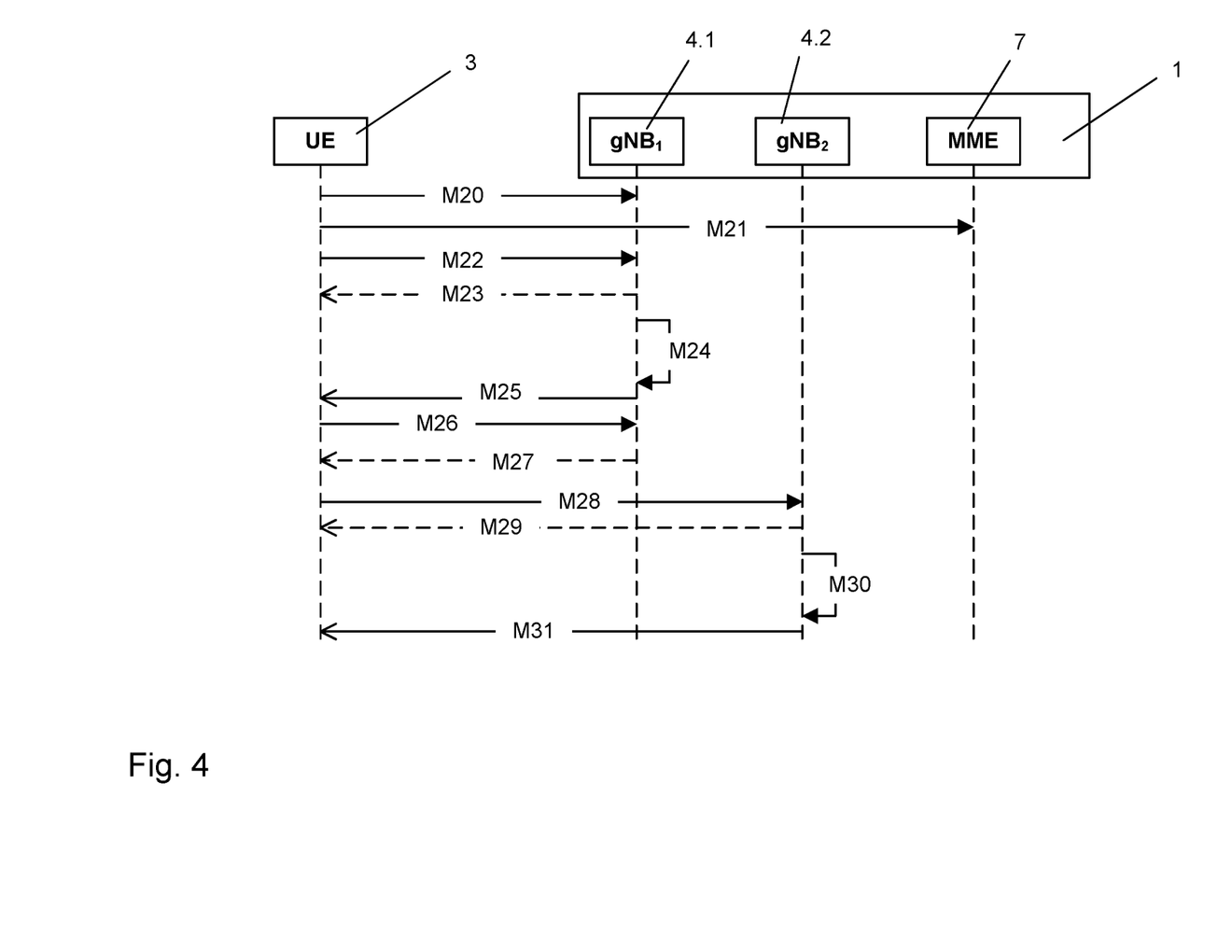
FIG. 4 shows a third sequence diagram showing an exemplifying embodiment of present invention.

On the cellular network side the number of provided quality of service values is about to be reduced by means of the embodiment shown in FIG. 4.

The exemplifying sequence of messages between user equipment 3 and the cellular network 1 components start with the user equipment camping on the first gNB 4.1, with message M20.

As shown in the previous embodiments, the user equipment sends—in particular after receiving quality of service values broadcasted from at least the serving gNB 4.1. —a NSSAI message M21 through the gNB 4.1 to the MME.

Then it attaches to service SERVICEX with message M22, and in response gets the setup message M23 from the gNB 4.1, which indicates that the gNB will fulfill the requested service. This is by now the shortened procedure as shown before, but without a reselection, some messages in between might be omitted for clarity purposes.

On the gNB side, the service request is registered by means of message M24, wherein a counter is incremented for the requested service. This gives a picture of the most requested services.

Alternatively the counters are maintained at the MME or another cellular network component, whereby a local concentration is useful. Alternatively the counters are maintained at the gNBs, but regularly or on request synchronized with the MME or other respective network component.

In any case, the counters give a picture about the most requested services, and consequently the gNB 4.1 in response broadcasts in message M25 the quality of service values only of the X most requested services where the gNB 4.1 is able to support. This allows to extremely minimize the amount of data to be transmitted, and still covers the majority of user equipment needs.

For the user equipment receiving the broadcasted information may then be handled and considered for the next attachment.

Certain network services are irrespective from frequency and will be provided by any base station, especially those network service which can occur in parallel to other network services. For that it is preferable to provide such network service irrespective of how often it was requested before. This is in particular useful for urgent services like an emergency related service.

However, if a service is not part of the broadcasted services, the user equipment nonetheless may want to attach to it. For this service the user equipment is blind in terms of information previously received from the gNB.

Consequently, when the user equipment wants to attach to service SERVICEY, it sends an attach message M26 to the gNB, indicating the desired service.

In the shown exemplifying embodiment the gNB 4.1 is not capable of fulfilling said service, resp. to attach to the network slice, e.g. due to the unavailability of the reserved frequency range for that network service/network slice.

Consequently it sends a redirect message M27, wherein the user equipment gets indicates the gNB 4.2, which is capable of fulfilling that service. The user equipment will then directly attach with message M28 to that gNB 4.2, preferably without the necessity to first evaluate the broadcast of that gNB.

The new gNB 4.2 will respond with a service setup message M29 and carry out the service for the user equipment, by means of the associated network slice on the reserved frequency range.

Also on side of gNB 4.2 the usage of that service is maintained and registered by an increment of a counter with message M30.

Consequently the gNB 4.2 then broadcasts with message M31 the quality of service values of the X most requested services, gNB 4.2. is able to support.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. A method for selection of a network slice by a user equipment operating in a cellular network, said network comprising at least two network slices, a plurality of base stations, and at least one network mobility unit, said user equipment being configured to camp on one of the base stations and to maintain a list of preferred network services; and for operation of a base station of said cellular network, said base station being configured to serve a plurality of user equipments camping on said base station, said user equipment setting up a preferred network service from said list of preferred network services, comprising:

sending a network slice selection message indicating a quality of service value relating to the preferred network service to a serving base station;

sending an attach request via the serving base station to the at least one network mobility unit, for attaching to a selected network service on a corresponding network slice;

operating the base station of said cellular network comprising:

receiving said network slice selection message from said user equipment indicating said quality of service relating to said preferred network service preferred by the user equipment, upon receiving said attach request from said user equipment, setting up the preferred network service on a network slice corresponding to said preferred network service, signalling to at least one of the camping user equipments a set of quality of service values supported by the base station, wherein the base station further maintains a list of requested network services occurrences, the method comprising a step of incrementing said network service occurrences in case of receiving said attach request for said network service, and wherein the step of signalling the set of quality of service values comprises a limited number of quality of service values which relate to a predetermined number of network services corresponding to said list of requested network service occurrences with highest usage.

2. The method according to claim 1, wherein the base station is further configured to provide system information by means of at least one of scheduled system information broadcast and on demand system information, wherein the system information comprises for at least one network service a frequency indication for using said network service.

3. The method according to claim 1, further comprising that in conjunction with signalling of the set of quality of service values the step of signalling at least one power consumption ratings for a frequency indication on which said network service is provided.

4. A method for: selection of a network slice by a user equipment operating in a cellular network, said network comprising at least two network slices, a plurality of base stations, and at least one network mobility unit, said user equipment being configured to camp on one of the base stations and to maintain a list of preferred network services, and operating a base station of the plurality of base stations of said cellular network, the base station being configured to serve a plurality of user equipments camping on said base station, said user equipment setting up a preferred network service from said list of preferred network services, comprising:

sending a network slice selection message indicating a quality of service value relating to the preferred network service to a serving base station, sending an attach request via the serving base station to the at least one network mobility unit, for attaching to a selected network service on a corresponding network slice, receiving from at least one of the plurality of base stations signalling from said base station indicating a set of quality of service values supported by at least one of the base stations, determining from the set of quality of service values at least one supported network service for respective base stations, prioritizing the respective base stations by means of said determined at least one supported network service in consideration of at least one out of the list of preferred network services, selecting said base station considering said prioritization, wherein in conjunction with receiving of the set of quality of service values receiving power consumption ratings affecting at least one frequency indication represented by the set of quality of service values, and the step of prioritizing also comprises considering said power consumption rating, wherein in case the selected network service is due not before a predetermined time period, selecting one of the base stations considering said prioritization and power consumption values for operating in idle mode, selecting one of other base station considering said prioritization and said power consumption values for attaching to said selected network service, within said predetermined time period;

operating the base station of said cellular network comprising:

receiving said network slice selection message from said user equipment indicating said quality of service relating to said preferred network service preferred by the user equipment, upon receiving said attach request from said user equipment, setting up the preferred network service on a network slice corresponding to said preferred network service.

5. The method according to claim 4, wherein the step of prioritization further comprises:

determining corresponding frequency indications from at least one out of the received set of quality of service values for at least two base stations, wherein the frequency indications comprise information relating to a frequency range the user equipment and the base station use for a communication link, considering said frequency indications of the selected base station for attaching to the selected network service.

6. The method according to claim 4, wherein in case the selected base station differs from the serving base station, prior to sending the attach message, performing a reselection for selecting a second base station as serving base station.

7. The method according to claim 4, wherein the set of quality of service values comprises a limited number of quality of service values which relate to a predetermined number of network services, wherein said network service are considered as network service with highest usage.

8. The method according to claim 4, wherein the user equipment maintains a list of network services each in relationship with a quality of service value, wherein the steps of evaluating and prioritizing refer to said list of network services.

9. A system for operating in a cellular network comprising at least two network slices, a plurality of base stations, and at least one network mobility unit, the system comprising:

a base station of the plurality of base stations, the base station comprising communication circuitry, at least one memory unit and processing circuitry, the base station being configured for:

signalling to at least one of camping user equipments a set of quality of service values supported by the base station, receiving a network slice selection message from one of the camping user equipments indicating a quality of service relating to a network service preferred by the user equipment, upon receiving an attach request from said user equipment, set up the network service on a network slice corresponding to said network service, maintain a list of requested network services occurrences, and increment said network service occurrences in case of receiving an attach request for said network service, wherein the set of quality of service values to be signaled only comprises a limited number of quality of service values which relate to a predetermined number of network services corresponding to said list of requested network service occurrences with highest usage;

an user equipment comprising communication circuitry, at least one memory unit and processing circuitry, the user equipment being configured to camp on one of the base stations to:

receive from at least one of the plurality of base stations said signalling indicating the set of quality of service values supported by the base station, determine from the set of quality of service values at least one supported network service for respective base stations, prioritize said respective base stations by means of said determined at least one supported network service in consideration of at least one out of a list of preferred network services, select one of the respective base stations considering said prioritization.

10. The system of claim 9, wherein the user equipment is configured for setting up of one of the preferred network service to:

send a network slice selection message indicating a quality of service value relating to the network service to the serving base station, send an attach request via the serving base station to the network mobility unit, for attaching to the selected network service on a corresponding network slice.

11. The system of claim 10, wherein the user equipment for said prioritizing is configured to:

determine corresponding frequency indications from at least one out of the received set of quality of service values for at least two base stations, wherein the frequency indications comprise information relating to a frequency range the user equipment and the base station use for a communication link, consider said frequency indications of the selected base station for attaching to the selected network service.

12. The system of claim 10, wherein the user equipment is further configured to receive power consumption ratings for at least one of the set of quality of service values and at least one frequency indication related to said quality of service value in conjunction with receiving of the set of quality of service values, and considering said power consumption rating for prioritizing of said at least one frequency indication.

13. The system of claim 10, wherein the user equipment is further configured to maintain a list of network services each in relationship with a quality of service value, wherein during evaluation and prioritizing the user equipment is configured to refer to said list of network services.

14. The system of claim 9, wherein the base station is further configured to signal power consumption ratings for a frequency indication on which said network service is provided in conjunction with signalling of the set of quality of service values.

* * * * *